United States Patent [19]

Bampton

[11] Patent Number: 4,603,089
[45] Date of Patent: Jul. 29, 1986

[54] LASER WELDING OF SANDWICH STRUCTURES

[75] Inventor: Clifford C. Bampton, Thousand Oaks, Calif.

[73] Assignee: Rockwell International Corporation, El Segundo, Calif.

[21] Appl. No.: 553,660

[22] Filed: Nov. 21, 1983

[51] Int. Cl.⁴ .................. B23K 26/18; B23K 31/02
[52] U.S. Cl. ........................ 428/593; 228/118; 228/157; 219/121 LD; 219/121 LA; 428/594
[58] Field of Search ................. 228/118, 157; 219/121 LC, 121 LD; 428/593, 594

[56] References Cited

U.S. PATENT DOCUMENTS

| | | | |
|---|---|---|---|
| 3,111,747 | 11/1963 | Johnson | 29/157.3 V |
| 3,112,559 | 12/1963 | Pauls | 29/157.3 V |
| 3,214,949 | 11/1965 | Johnson | 29/157.3 V X |
| 3,949,186 | 4/1976 | Nakayama | 219/121 LD |
| 4,295,255 | 10/1981 | Weber | 228/157 X |
| 4,304,821 | 12/1981 | Hayase et al. | 228/157 X |
| 4,361,262 | 11/1982 | Israeli | 228/157 X |
| 4,379,219 | 4/1983 | Behrens et al. | 219/121 LC |

*Primary Examiner*—Kenneth J. Ramsey
*Attorney, Agent, or Firm*—Charles T. Silberberg

[57] ABSTRACT

A process is disclosed for bonding multi-layer sheet structure by using controlled depth laser welding. The laser energy may be applied in stages, whereby the inner sheets are first welded together and, the outer sheets are then joined thereto. The sheets are thereafter expanded to form the desired structure. Although the laser energy may be varied to control the depth of penetration, one embodiment utilizes a shield material to be applied between two sheets to prevent the laser energy from penetrating and joining the two sheets together. Similarly, shields may be used to control the width of the laser weld.

18 Claims, 7 Drawing Figures

LASER WELDING OF SANDWICH STRUCTURES

BACKGROUND

The invention pertains to an improved method of welding together sheets utilizing high energy lasers, to form layered sheet structures for use in the aircraft industry.

Superplastic forming combined with diffusion bonding (SPF/DB) is finding increased usage in sandwich structures in the aircraft industry (see U.S. Pat. No. 3,927,817 entitled "Method of Making Metallic Sandwich Structures" by Hamilton, et. al. which is incorporated herein by reference). Superplasticity is the capability of certain metals to develop unusually high elongations with reduced tendency towards necking, within a limited temperature and strain rate range. Diffusion bonding is a metallurgical joining of similar metallic parts which are pressed together at elevated temperatures and pressures.

Many of the same alloys used in superplastic forming can also be used in diffusion bonding. When the two processes are combined, the temperatures and pressures for both processes are similar so that complex and expanded sandwich structures can be formed in what is essentially a one-step operation.

However, SPF/DB has several limitations:
1. only those materials which are superplastic may be used,
2. the structures must be raised to high superplastic forming temperatures and pressures,
3. the considerable stretching may produce a non-uniform product, having non-uniform strength properties, and
4. certain materials cannot be readily diffusion bonded.

A novel process for fabricating sandwich structures without the use of superplastic materials, is described in U.S. Pat. No. 4,361,262 entitled "Method of Making Expanded Sandwich Structures" and in U.S. application, Ser. No. 466,987 filed 2-16-83, entitled "Accordion Expansion Process" both by Leonardo Israeli, which are both incorporated into this specification by reference. The process is essentially an unfolding process, and usually requires minimal tensile stretching of the material during expansion, i.e. the expansion of the structure is due substantially to unfolding rather than stretching. The accordion expansion process may be used as an alternative for superplastic forming. However, diffusion bonding, requires high temperatures and pressures, and is limited to certain materials. Hence, an alternative bonding process is needed that does not require high temperatures and pressures, that is applicable to a broad range of materials, and that can be used with accordion expansion to form sandwich structures.

Lasers are well suited as a manufacturing tool. Material processing is currently one of the most important industrial applications of lasers. Laser welding, which can be accomplished at or near atmospheric conditions, produces the highest energy concentration of all welding processes. Lasers can generate a high power density that is localized and controllable over a small area. Also, lasers allow for cost efficient energy utilization, minimal distortion and softening in the surrounding interlayer, and simplified material handling. Since lasers result in the application of considerable amounts of high energy in short time intervals, high speed manufacturing, accuracy, and repeatability are inherent in laser applications.

What is needed is a process that will utilize the many advantages of laser processing to weld sheet structures prior to expansion to achieve the same kind of monolithic sandwich structures produced by superplastic forming and diffusion bonding.

SUMMARY

It is therefore a principal object of the present invention to provide a new method of metallurgically bonding layered sheet structure.

It is another object of the present invention to provide a new method of making expanded, sandwich structure, while avoiding the high pressures and temperatures associated with diffusion bonding.

Another object of the present invention is to incorporate controlled depth welding inherent in laser technology into the fabrication of expandable, layered sheet structure.

It is another object of the invention to provide a new method of controlling the depth and width of a laser weld in layered sheet structure.

The present invention involves controlling the welding depth in layered sheet structure prior to expansion so as to bond these sheets together in a pre-selected pattern. After three sheets have been positioned in a stack, a laser is used to weld the center core sheet to each face sheet. Laser welding is the joining of two similar surfaces by applying laser energy to the materials so that the adjoining surfaces are merged into each other. It is of critical importance to control the depth of the weld, so that at any one seam, the welded region does not penetrate into the distant face sheet, since this will interfere with the proper formation of the sandwich structure.

Although it is planned that the present invention will be used primarily with metallic structures, the invention may also be applied to nonmetallic structures. The lasing energy melts the material in the laser welding area, and forms a pool of material, which resolidifies thereby forming the weld. Dissimilar materials are not normally used because of the difficulty in controlling the composition of the resolidified weld.

Laser welding is applied to the layered sheet structure prior to expansion. After the surfaces are welded together, additional heat and pressure are applied as required to expand the stack to form the finished structure.

The novel features which are believed to be characteristic of this new method of laser welding layered sheet structure, together with further objects and advantages thereof, will be better understood from the following description in connection with the accompanying drawings in which presently preferred embodiments of the invention are illustrated by way of examples. It is to be expressly understood, however, that the drawings are for purposes of illustration and description only, and are not intended as a definition of the limits of the invention.

DETAILED DESCRIPTION OF THE INVENTION

All drawings are exaggerated for purposes of illustration, since sheet thickness will ordinarily range from 0.05 to 0.15 inches.

Figure 1:
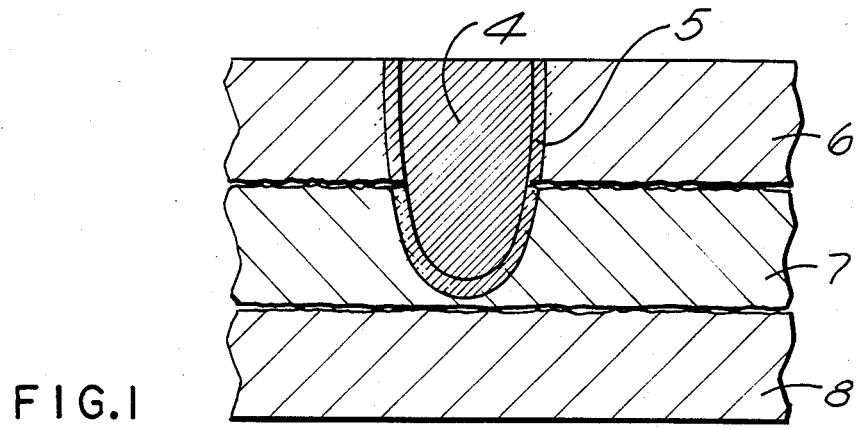
FIG. 1 depicts a detail view of the laser welded region of a three sheet structure prior to expansion.

Referring now to the drawings, there is shown in FIG. 1 a typical laser welded region 4 in a three-sheet stack prior to expansion. The three-sheet stack includes two face sheets 6 and 8, and core sheet 7. The laser energy penetrates through face sheet 6 and into core sheet 7, forming laser welded region 4 which is surrounded by heat affected zone 5.

The sheets are preferably in intimate contact, but unlike diffusion bonding this is not required. It is suggested that spaces between the sheets 6, 7, and 8 do not exceed ten percent of the sheet thickness.

The heat affected zone 5 surrounds the laser welded region 4 and is the zone of plastic deformation of the material in the vicinity of the joint. As a result of the high concentration of laser energy and the intensity of the energy, laser welding is characterized by the fact that the thickness of the heat affected zone 5 is three to five times smaller than the similar zone produced by other welding techniques. Although zone 5 is not melted, it may be subject to transformation produced by the laser energy. The thinness of zone 5 results in laser welds that are about five times lower in residual strains and transverse strains than conventional arc welds. It is believed that the thin heat affected zone 5 also contributes to the improved corrosion and fatigue strength of the laser welded regions.

Figure 3:
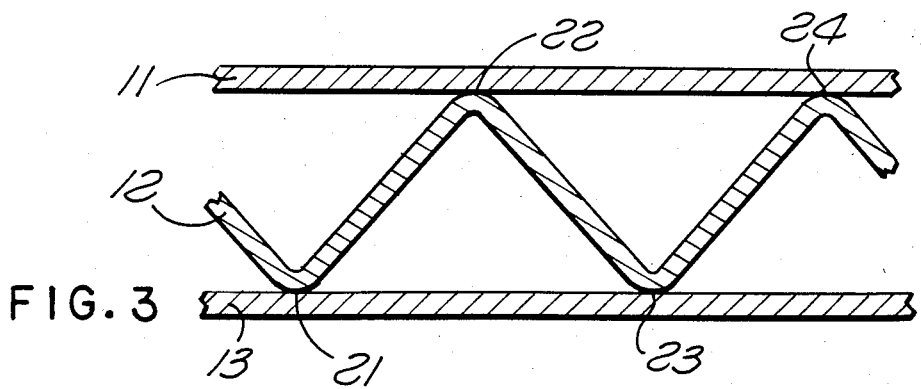
FIG. 3 depicts a cross-sectional view of a three-sheet sandwich structure after expansion, wherein a core sheet is surrounded by two face sheets.

Referring now to FIG. 3 a three-sheet sandwich structure is shown after expansion. Laser welding is used to seam weld face sheet 13 to core sheet 12, for example at welded areas 21 and 23. Care must be exercised to control the weld depth, so that excess energy will not weld face sheet 11 to welded areas 21 and 23. Similarly, welded areas 22 and 24 are formed by welding face sheet 11 to core sheet 12.

Figure 4:
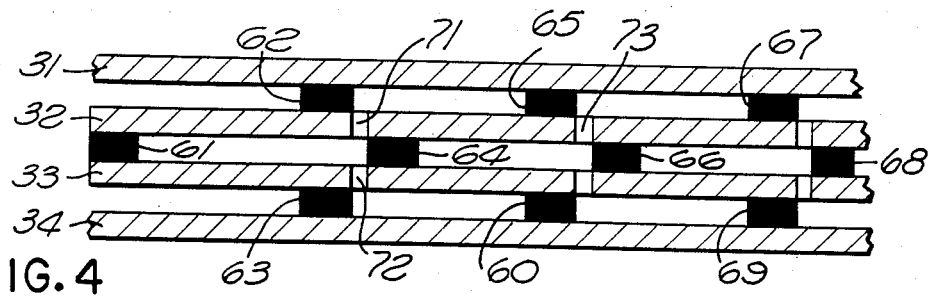
FIG. 4 depicts a cross-sectional view of a four-sheet sandwich structure prior to expansion.
Figure 5:
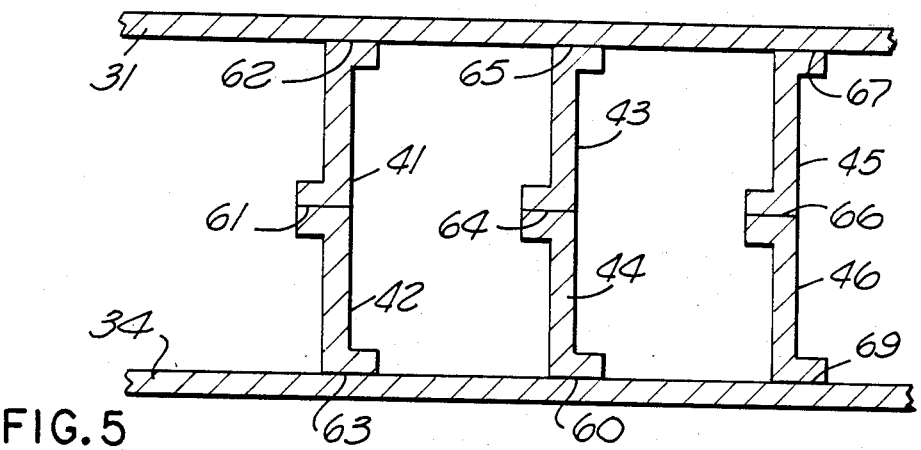
FIG. 5 depicts a cross-sectional view of a four-sheet sandwich structure shown in FIG. 4 after expansion, which is aligned with FIG. 4, wherein accordion expansion has been used to form a vertical core.

FIG. 4 and FIG. 5 are aligned and depict the forming of a four-sheet sandwich structure formed by accordion expansion. FIG. 4 depicts the pre-expanded stack having face sheets 31 and 34, and core sheets 32 and 33, which are selectively cut prior to expansion at cutouts (e.g. 71, 72, and 73). It is preferred that one core sheet is used for each layer of workpieces, with each sheet having the cutouts. It is further suggested that narrow slivers of sheet (not shown) be used to hold the workpieces in position within the stack, wherein the slivers rupture during the forming process. The four-sheet structure must be formed in stages if laser welding is employed, since to do otherwise would require welding at each welded area through a face sheet. By laser welding in stages, complex multisheet expanded structures can be formed by the process of the present invention. Hence, core sheets 32 and 33 are laser welded at areas 61, 64, 66, and 68. Then, face sheet 31 is added and controlled depth laser welded at areas 62, 65, and 67. Finally, face sheet 34 is added and controlled depth laser welded at areas 63, 60, and 69.

FIG. 5 depicts the expanded structure. The core sheets 32 and 33 have been unfolded and stretched using accordion expansion to form a substantially vertical core supporting face sheets 31 and 34, comprising core pairs 41 and 42, 43 and 44, and 45 and 46. It is estimated that only about five to ten percent stretching is required to make the combined pairs substantially vertical and capable of supporting heavier traverse loads.

Figure 6:
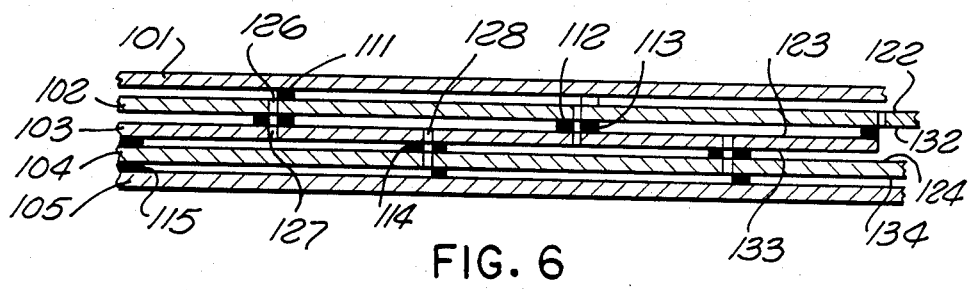
FIG. 6 depicts a cross-sectional view of a five-sheet sandwich structure prior to expansion.
Figure 7:
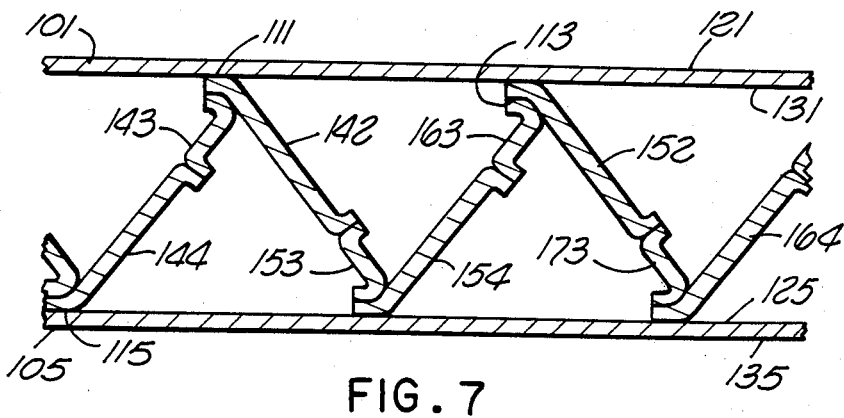
FIG. 7 depicts a cross-sectional view of the same five-sheet sandwich structure shown in FIG. 6 after expansion, wherein accordion expansion has been used to form an oblique core.

FIG. 6 and FIG. 7 are aligned and depict the forming of a five-sheet sandwich structure by accordion expansion. FIG. 6 depicts the pre-expanded structure having face sheets 101 and 105, and core sheets 102, 103, and 104, which are selectively cut prior to expansion at slots (e.g. 126, 127, and 128). Core sheets 102, 103, and 104 are positioned and controlled depth laser welded together at seamed welded areas (e.g. 112, 113, and 114). Then face sheet 101 is added and controlled depth laser welded (e.g. 111) to the three core sheets 102, 103, and 104. Face sheet 105 is added and also controlled depth laser welded to the assembly.

FIG. 7 depicts the five sheet expanded structure. The core sheets 102, 103, and 104 have been unfolded and stretched using accordion expansion to form a linear but substantially oblique core (e.g. 143 and 144, and 142 and 153) relative to and supporting the face sheets 101 and 105.

Figure 2:
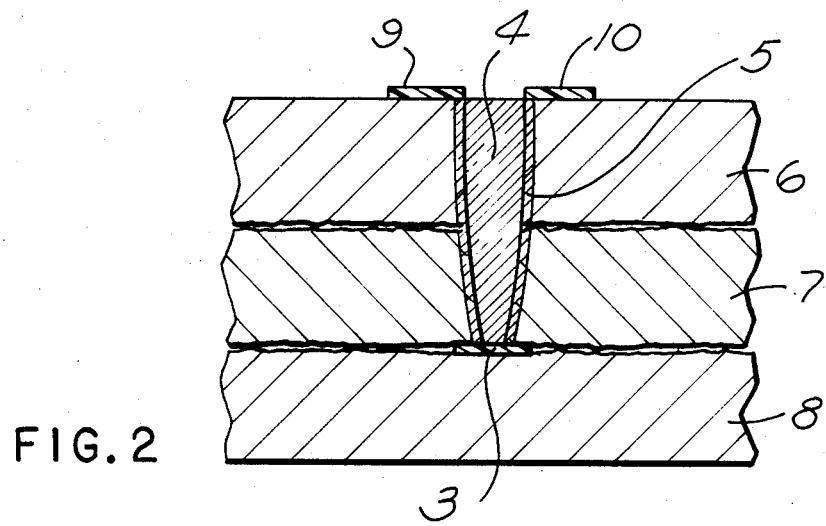
FIG. 2 depicts a detail view of the laser welded region of a three sheet structure using shield materials, prior to expansion.

Referring now to FIG. 2, it may be necessary to insure that the laser energy does not penetrate too deeply, thereby creating an unwanted weld. This can be achieved by interlaying a shield 3 between the sheets 7 and 8, thereby covering the sheet 8 not to be welded. The use of shield material 3 may be further required under certain conditions because the sheets are normally extremely thin (0.05 inches to 0.15 inches) necessitating precise energy control. Conceptually, a wide variety of shield materials may be utilized, including plastics, thin films, or chemicals. If the shield materials used are reflective, the excess energy that penetrates the shield material can be reflected back into the covering sheet to solidify that weld. However, it is preferred that the shield material be an energy absorbing compound, tailored to the wavelength of the incident laser beam. If a $CO_2$ laser were used, it is believed that sulfur hexafluoride will provide significant protection for an underlying metal resulting from the very high absorbance of the laser beam energy. A thin coat of the chemical only provides temporary protection, but since laser dwell-time at any position is short, a thin coating should suffice.

In addition, a shield material may be used to control the width of the laser weld. Shields 9 and 10 are placed on top of sheet 6, and are used to control the weld width. The shields 9, 10, and 3 may be removed after the welding is completed.

In controlled depth laser welding, as used in the present invention, the amount of laser power varies considerably with various materials. Surface absorption or, conversely, surface reflectivity is believed to be the primary property that determines the amount of laser power needed for the controlled depth welding. Thermal conductivity is also important.

A typical set of parameters using a continuous $CO_2$ laser with helium gas shielding to lap weld 5000 series aluminum sheet, each sheet having a thickness of about 0.10 inches, would be as follows:

laser beam wavelength—10,600 nm
    laser beam power on target—4000 watts
    travel speed—50–60 in/min
    beam spot diameter at the work surface—0.25 to 0.75 mm
    weld penetration—0.14 and 0.16 inches Although a YAG laser having a wavelength of 1060 nm would be preferred to the $CO_2$ laser, suitable parameters for welding aluminum sheet with the YAG laser are not currently known. This shorter wavelength allows for greater absorption of power at the sheet and a lower power requirement, which reduces operating costs and allows for more precise control.

Although the relationship between the laser power and the depth of the weld will normally have to be determined experimentally for each material, it is believed that any gap between the sheets will have minimal effect upon laser power. Hence, that these relationships will be in close correlation with the laser power required for controlled depth welding of solid material.

Hence, there has been provided, in accordance with the invention, a method of controlled depth welding of expandable sheet structure that fully satisfies the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

I claim:

1. A process of forming a sandwich structure which comprises:
    a. positioning three sheets in a stack relative to each other;
    b. penetrating at selected areas of said stack to a predetermined controlled depth with a laser beam to effect welding at said selected areas, such that at said selected areas only a select number of said sheets less than all are welded together; and
    c. expanding said stack by applying a pressure differential to the interior and exterior of said stack.

2. The process of claim 1, wherein said expanding involves accordion expansion.

3. The product formed by the process of claim 1.

4. A process of forming a sandwich structure which comprises:
    (a) positioning at least three sheets in a stack relative to each other, said stack comprised of at least one face sheet and at least one core sheet;
    (b) penetrating at selected areas of said stack to a predetermined controlled depth with a laser beam to effect welding at said selected areas, such that at said selected areas only a select number of said sheets less than all are welded together, said selected areas being in a pattern which defines the core of said sandwich structure; and
    (c) expanding the welded stack by applying a pressure differential to the interior and exterior of said stack.

5. The process of claim 4, wherein said sheets of said stack are contacting at their principal surfaces.

6. The process of claim 5, wherein only two of said sheets are welded together at said selected areas.

7. The process of claim 4, wherein only two of said sheets are welded together at said selected areas.

8. The process of claim 4, wherein said at least one cure sheet is deformed about said selected areas during said expanding step.

9. The process of claim 4, wherein said at least one core sheet is expanded between said selected areas during said expanded step.

10. The process of claim 4, wherein during said expanding step said at least one core sheet is caused to separate from said at least one face sheet except at said selected areas.

11. The process of claim 4, wherein at least one of said core sheets and one of said face sheets possess superplastic properties, and said expanding involves superplastic forming of said sheets having superplastic properties.

12. The process of claim 4, wherein said expanding involves accordion expansion.

13. The process of claim 4, wherein there are two core sheets, and also including joining said core sheets together at selected areas prior to said positioning step.

14. The process of claim 13, wherein at least one of said core sheets and one of said face sheets possess superplastic properties, and said expanding involves superplastic forming of said sheets having superplastic properties.

15. The process of claim 13, wherein said expanding involves accordion expansion.

16. The process of claim 4, wherein there are three core sheets, and also including prior to step (a) positioning said core sheets in a first stack, and penetrating at preselected areas said first stack to a predetermined controlled depth with a laser beam to effect welding at said preselected areas such that at said preselected areas only two of said core sheets are welded together.

17. The process of claim 16, wherein at least one of said core sheets and one of said face sheets possess superplastic properties, and said expanding involves superplastic forming of said sheets having superplastic properties.

18. The process of claim 16, wherein said expanding involves accordion expansion.

* * * * *